United States Patent [19]

Nakayama

[11] Patent Number: 4,686,344
[45] Date of Patent: Aug. 11, 1987

[54] WIRE GUIDE FOR ELECTRODE DISCHARGE MACHINING

[75] Inventor: Yoshiro Nakayama, Aichi, Japan

[73] Assignee: Mitsubishi Denki Kabushiki Kaisha, Tokyo, Japan

[21] Appl. No.: 798,493

[22] Filed: Nov. 15, 1985

[30] Foreign Application Priority Data

Nov. 16, 1984 [JP] Japan ................. 59-240785

[51] Int. Cl.⁴ ............................. B23H 7/10
[52] U.S. Cl. ........................... 219/69 W; 204/206
[58] Field of Search .............. 219/69 W, 69 E; 204/206, 224 M

[56] References Cited

U.S. PATENT DOCUMENTS

| | | | |
|---|---|---|---|
| 4,417,118 | 11/1983 | Miyano | 219/69 W |
| 4,507,532 | 3/1985 | Inoue | 219/69 W |
| 4,539,459 | 9/1985 | Yamagata | 219/69 W |
| 4,611,107 | 9/1986 | Inoue | 219/69 W |
| 4,613,740 | 9/1986 | Ichikawa | 219/69 W |

FOREIGN PATENT DOCUMENTS

| | | | |
|---|---|---|---|
| 130758 | 1/1985 | European Pat. Off. | 219/69 W |
| 2207942 | 11/1972 | Fed. Rep. of Germany. | |
| 56-56346 | 5/1981 | Japan | 219/69 W |
| 56-76337 | 6/1981 | Japan | 219/69 W |
| 115127 | 7/1984 | Japan | 219/69 E |
| 1574048 | 9/1980 | United Kingdom. | |

*Primary Examiner*—A. D. Pellinen
*Assistant Examiner*—Geoffrey S. Evans
*Attorney, Agent, or Firm*—Sughrue, Mion, Zinn, Macpeak and Seas

[57] ABSTRACT

A pair of guide devices 5, 6 for the wire electrode 1 in a discharge machining apparatus are disposed just above and below a workpiece 3. Each device includes three or more equally circumferentially spaced guide rings 8, 9, 10 surrounding the electrode and biased outwardly by tension springs 11, 12, 13 coupled to an enclosing frame member 7, to thereby center the electrode and prevent any lateral displacements during use. As an alternative the rings may be replaced by guide balls, 22, 23, 24 biased radially inwardly against the electrode by compression springs or fluid cylinders.

4 Claims, 7 Drawing Figures

WIRE GUIDE FOR ELECTRODE DISCHARGE MACHINING

BACKGROUND OF THE INVENTION

This invention relates in general to an apparatus for machining a workpiece by electro-erosion using a wire fed through a machining zone of the workpiece.

In such an apparatus the wire electrode is fed at a predetermined longitudinal velocity to compensate for the wear of the electrode, while being transversely displaced relative to the workpiece. The displacement between the wire electrode and the workpiece is generally effected automatically by a servo system under the control of programmed instructions defining a predetermined machining path.

This invention relates more specifically to a wire electrode guide for a discharge machining apparatus.

It is known to hold an electrode in contact with guide surfaces by mechanical means as described in German Offenlegungsschrift No. 2,207,942 and British Patent No. 1,574,048.

FIG. 1 is a sectional view of such a conventional guide arrangement for a wire electrode discharge machining apparatus, wherein reference numeral 1 designates a wire electrode, 2 are individual guides disposed above and below a workpiece 3, and 4 are a pair of contacts for supplying electrical machining power from a power supply (not shown) to the wire electrode.

In such an apparatus the wire electrode 1 is fed through the machining zone while being supplied with power through the pair of contacts 4, whereby the workpiece 3 is machined in a controlled manner by electro-erosion. The servo system for effecting the relative displacement between the wire electrode and the workpiece is not shown.

The pair of contacts 4 engage the wire electrode 1 at points eccentric to a center line linking the guides 2, as shown in FIG. 1. Since the eccentric contact points are both on the same side of the wire electrode, and the inner diameter of the guides is greater by about 2-5 mm than the diameter of the wire electrode, a gap D is formed between the wire electrode and each guide as shown in FIG. 2. During the machining of the workpiece the wire electrode is acted upon by external forces, such as those produced by a machining fluid or discharge phenomena, which tend to displace the electrode within the range of the gap D between the electrode and the guides. However, since the eccentric force exerted by the contacts 4 is greater than these external forces the electrode movement is constrained in the X direction in FIG. 2. Significant displacements occur in the Y direction, however, which reduces the precision and accuracy of the machining operation. Also, since the inner diameter of the guides 2 is about 2-5 mm greater than the diameter of the wire electrode 1, it becomes necessary to replace the guides whenever the wire electrode diameter is changed.

p SUMMARY OF THE INVENTION

This invention avoids the above mentioned drawbacks by providing a guide device for a wire electrode discharge machining apparatus which prevents the movement of the wire electrode in the gap between the electrode and its guide, thereby improving the machining precision. According to the invention at least one of the upper and lower guide devices has at least three guide members which are in direct contact with the wire electrode at three equally circumferentially spaced radial points thereon. The resilient biasing of the guide members ensures full and constant contact with the wire electrode without any gaps to thereby preclude any lateral displacements of the electrode during machining operations.

DETAILED DESCRIPTION OF THE PREFERRED EMBODIMENTS

Figure 1:
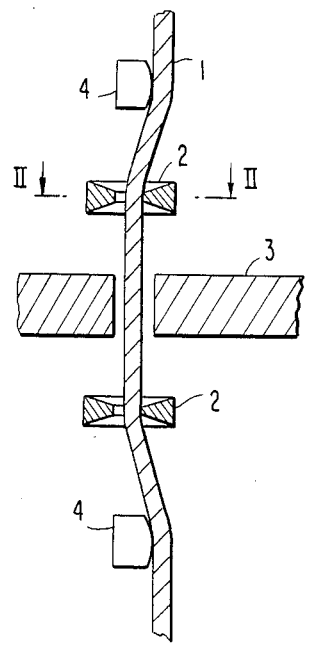
FIG. 1 is a sectional elevation of a conventional guide arrangement for a wire electrode discharge machining apparatus.
Figure 2:
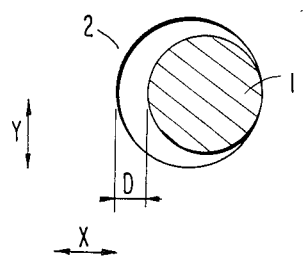
FIG. 2 is a schematic cross-section taken on line II—II in FIG. 1.
Figure 3:
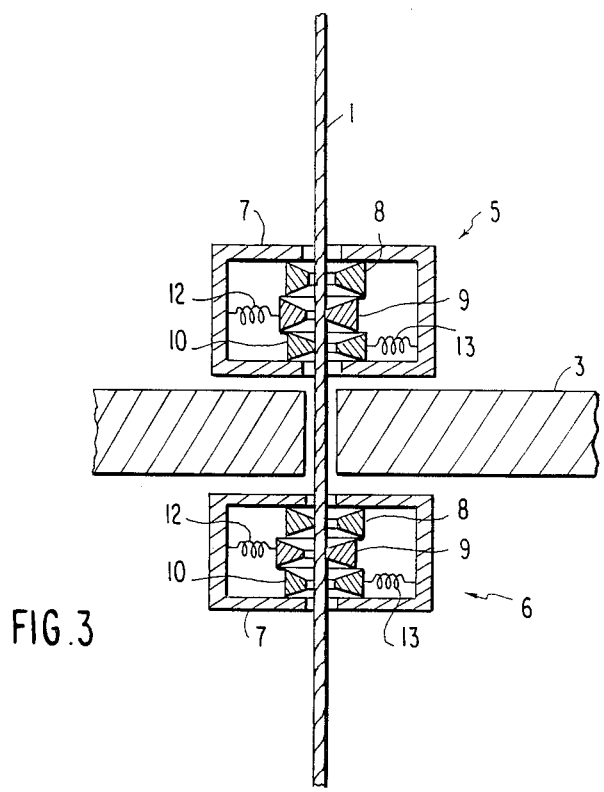
FIG. 3 is a sectional elevation of a guide device arrangement according to the invention.
Figure 4:
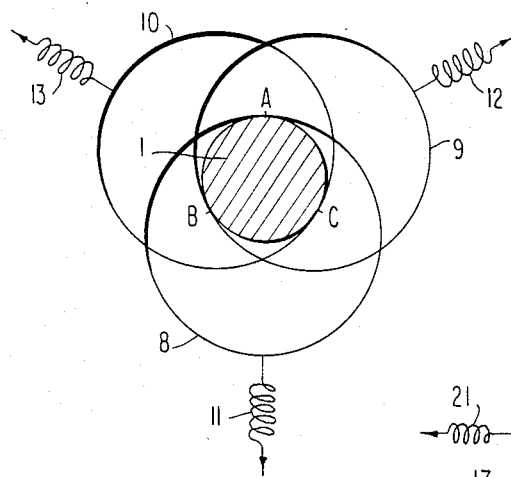
FIG. 4 is a schematic cross-section of one of the guide devices of FIG. 3.

Referring to the preferred embodiment of the invention as shown in FIGS. 3 and 4, a pair of identically configured guide devices 5, 6 engage the wire electrode 1 just above and below the workpiece 3. Each such device comprises a centrally apertured frame member 7 surrounding the electrode, and three ring like guide members 8, 9, 10 arranged in a vertical stack and individually biased towards the frame member by respective tension springs 11, 12, 13. The frame members 7 are fixed to the body of the discharge machining apparatus (not shown) for movement therewith relative to the workpiece in a servo controlled manner. The power supply contacts are not shown, but may advantageously take the form of pinch rollers or the like to avoid the application of any eccentric forces to the wire electrode. The guide member springs are sufficiently strong to override any external forces applied to the electrode during use.

The guide members and their respective springs are equally circumferentially spaced at angles of 120°, and the guide members 8, 9 and 10 thus contact the wire electrode 1 at similarly spaced outer radial points A, B and C as shown in FIG. 4. With such an arrangement the wire electrode is positively and continuously retained in a centered position without the formation of any gaps to enable lateral displacements of the electrode, thereby greatly enhancing the accuracy of the machining operation. Moreover, the inherent resiliency of the biasing springs easily accommodates changes in the diameter of the wire electrode without necessitating the replacement of the individual guide members.

Although two guide devices 5, 6 are preferably employed in the manner illustrated in FIGS. 3 and 4, it would also be possible to use just one such guide device— albeit at the expense of reducing the advantageous effects of the invention by a factor of one-half.

Furthermore, although three guide members and associated springs are shown in FIGS. 3 and 4, a greater number of such components could also be used. The arrangement of FIG. 5, for example, employs four ring like guide members 14, 15, 16 and 17 outwardly biased by springs 18, 19, 20 and 21 disposed at equal circumferential spacings of 90°.

Figure 5:
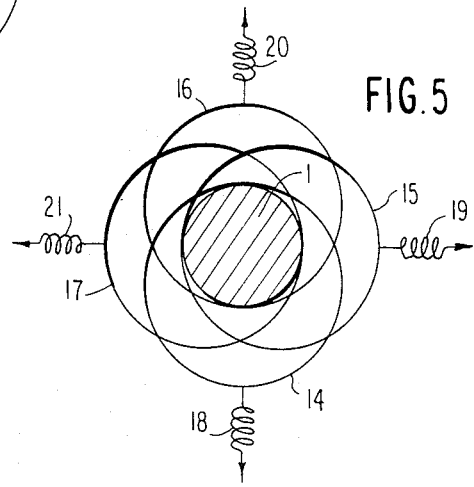
FIGS. 5, 6 and 7 are similar schematic cross-sections of alternate guide device embodiments.
Figure 6:
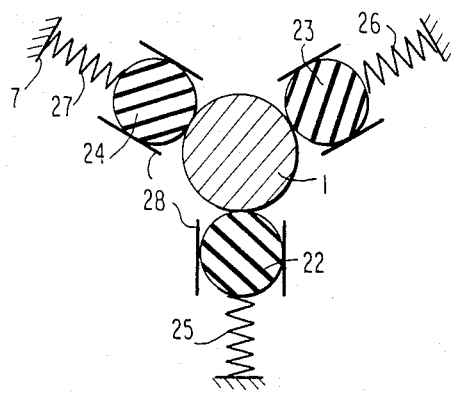

In the embodiments of FIGS. 3-5 the guide member rings are outwardly biased by tension springs coupled to the frame members. FIG. 6 shows an alternate embodiment wherein the guide members take the form of resilient ball elements 22, 23, 24 of rubber or the like, and instead of being outwardly biased they are urged inwardly towards the wire electrode by compression springs 25, 26, 27 mounted to the frame member. Reference numeral 28 designates tubular guideways for constraining the ball elements to move in only a radial direction relative to the wire electrode.

Figure 7:
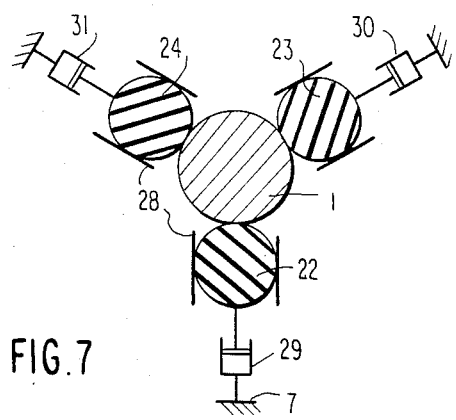

The embodiment illustrated in FIG. 7 differs from that of FIG. 6 only by the replacement of the compression springs with fluid cylinders 29, 30 and 31 for resiliently urging the ball elements against the wire electrode. Such fluid cylinders could be hydraulic, in which case the necessary resiliency would be provided by the rubber ball elements alone, or pneumatic to provide additional resiliency.

As a further alternative the individual biasing springs or fluid cylinders could be replaced by a single biasing member, for example a rubber or elastic band(s) surrounding the ball elements in FIGS. 6 or 7. Similarly, the separate tension springs in the FIGS. 3–5 embodiments could be replaced by a single expansion ring surrounding the guide members and coupled to each one for urging them outwardly.

What is claimed is:

1. In a discharge machining apparatus including a circular cross-section wire electrode (1) adapted for relative movement with respect to a workpiece (3), contact means (4) engaging the electrode for supplying electrical power thereto, and a pair of upper and lower guide devices individually disposed above and below the workpiece in contact with the electrode, the improvement characterized by at least one of the guide devices comprising:
   (a) a centrally apertured frame member (7) surrounding the electrode,
   (b) at least three equally circumferentially spaced guide members disposed within the frame member and in individual contact with the electrode at three corresponding equally circumferentially spaced points, and
   (c) means supported by the frame member and individually coupled to the guide members for applying equal, radially inwardly directed forces to the electrode at said spaced guide member contact points to thereby resist any lateral displacements of the electrode and maintain the electrode in a centered position to implement accurate machining,
   (d) wherein the guide members are ball elements (22, 23, 24) individually disposed in guideways (28) for constraining them to radial movement relative to the electrode, and the force applying means comprises fluid cylinders (29, 30, 31) individually coupled between the ball elements and the frame member.

2. An apparatus according to claim 1, wherein both of the upper and lower guide devices are identically configured.

3. An apparatus according to claim 2, wherein the ball elements are rubber balls, and the fluid cylinders are hydraulic cylinders.

4. An apparatus according to claim 2, wherein the ball elements are rubber balls, and the fluid cylinders are pneumatic cylinders.

* * * * *